(12) United States Patent
Aldereguia et al.

(10) Patent No.: US 7,627,800 B2
(45) Date of Patent: Dec. 1, 2009

(54) COMMUNICATING WITH ERROR CHECKING TO A DEVICE CAPABLE OF OPERATING ACCORDING TO AN ADDRESS PREFIX SERIAL BUS PROTOCOL

(75) Inventors: Alfredo Aldereguia, Cary, NC (US); Grace A. Richter, Chapel Hill, NC (US); Jeffrey B. Williams, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 11/419,533

(22) Filed: May 22, 2006

(65) Prior Publication Data
US 2007/0271490 A1    Nov. 22, 2007

(51) Int. Cl.
*H03M 13/47* (2006.01)
(52) U.S. Cl. .......................... 714/746; 714/799
(58) Field of Classification Search ................. 714/746, 714/799
See application file for complete search history.

(56) References Cited
U.S. PATENT DOCUMENTS

| | | | |
|---|---|---|---|
| 6,026,354 A * | 2/2000 | Singh et al. ............. | 702/186 |
| 6,307,974 B1 * | 10/2001 | Tsujimoto ............... | 382/239 |
| 6,559,980 B1 * | 5/2003 | Joffe ...................... | 358/442 |
| 6,609,221 B1 * | 8/2003 | Coyle et al. ............. | 714/715 |
| 6,684,362 B1 * | 1/2004 | Currier et al. .......... | 714/758 |
| 6,691,257 B1 | 2/2004 | Suffin | |
| 6,728,908 B1 | 4/2004 | Fukuhara et al. | |
| 6,874,052 B1 | 3/2005 | Delmonico | |
| 7,269,679 B1 * | 9/2007 | Cho et al. ............... | 710/311 |
| 2004/0143780 A1 * | 7/2004 | DiMambro et al. ..... | 714/716 |
| 2004/0210800 A1 | 10/2004 | Vecoven et al. | |

* cited by examiner

*Primary Examiner*—Stephen M Baker
(74) *Attorney, Agent, or Firm*—John R. Biggers; Cynthia G. Seal; Biggers & Ohanian, LLP.

(57) ABSTRACT

Methods, apparatus, and computer program products are disclosed for communicating with error checking to a device capable of operating according to an address prefix serial bus protocol that includes identifying whether the device supports error checking, and if the device supports error checking: setting the device in an error checking mode and sending a message with error checking data to the device. Communicating with error checking to a device capable of operating according to an address prefix serial bus protocol may include performing an error checking operation on the message to obtain error checking data. Communicating with error checking to a device capable of operating according to an address prefix serial bus protocol may include retrieving the device's error checking capability from a device table.

18 Claims, 7 Drawing Sheets

COMMUNICATING WITH ERROR CHECKING TO A DEVICE CAPABLE OF OPERATING ACCORDING TO AN ADDRESS PREFIX SERIAL BUS PROTOCOL

BACKGROUND OF THE INVENTION

1. Field of the Invention

The field of the invention is data processing, or, more specifically, methods, apparatus, and products for communicating with error checking to a device capable of operating according to an address prefix serial bus protocol.

2. Description of Related Art

The Inter-Integrated Circuit ('I²C') bus protocol is a well-known and widely-popular bus protocol for implementing data communications between computer devices. The I²C bus protocol is a serial computer bus protocol for connecting electronic components inside a computer that was first published in 1982 by Philips. I²C is a simple, low-bandwidth, short-distance protocol. Most available I²C devices operate at speeds up to 400 Kbps, although some I²C devices are capable of operating up at speeds up to 3.4 Mbps. Using I²C, multiple devices may easily be linked together since I²C has a built-in addressing scheme. Current versions of the I²C have a 10-bit addressing mode with the capacity to connect up to 1008 nodes.

Although the I²C bus protocol is well-known and widely-popular, the I²C bus protocol does have certain limitations. Because of the simple design of the I²C bus protocol and the original application of the protocol, the I²C protocol does not support error checking such as, for example, parity checking, cyclic redundancy checking, error-correcting codes, and so on. Implementing data communications connections using the I²C bus protocol, therefore, may lead to undiscovered errors being introduced into the data transmitted through an I²C data communications connection. Such undiscovered errors may cause a computer system to malfunction or produce incorrect results.

SUMMARY OF THE INVENTION

Methods, apparatus, and computer program products are disclosed for communicating with error checking to a device capable of operating according to an address prefix serial bus protocol that includes identifying whether the device supports error checking, and if the device supports error checking: setting the device in an error checking mode and sending a message with error checking data to the device. Communicating with error checking to a device capable of operating according to an address prefix serial bus protocol may include performing an error checking operation on the message to obtain error checking data. Communicating with error checking to a device capable of operating according to an address prefix serial bus protocol may include retrieving the device's error checking capability from a device table. Communicating with error checking to a device capable of operating according to an address prefix serial bus protocol may include polling the device for error checking capability and storing the device's error checking capability in a device table. Communicating with error checking to a device capable of operating according to an address prefix serial bus protocol may include resetting the device back to a normal mode of operation without error checking.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
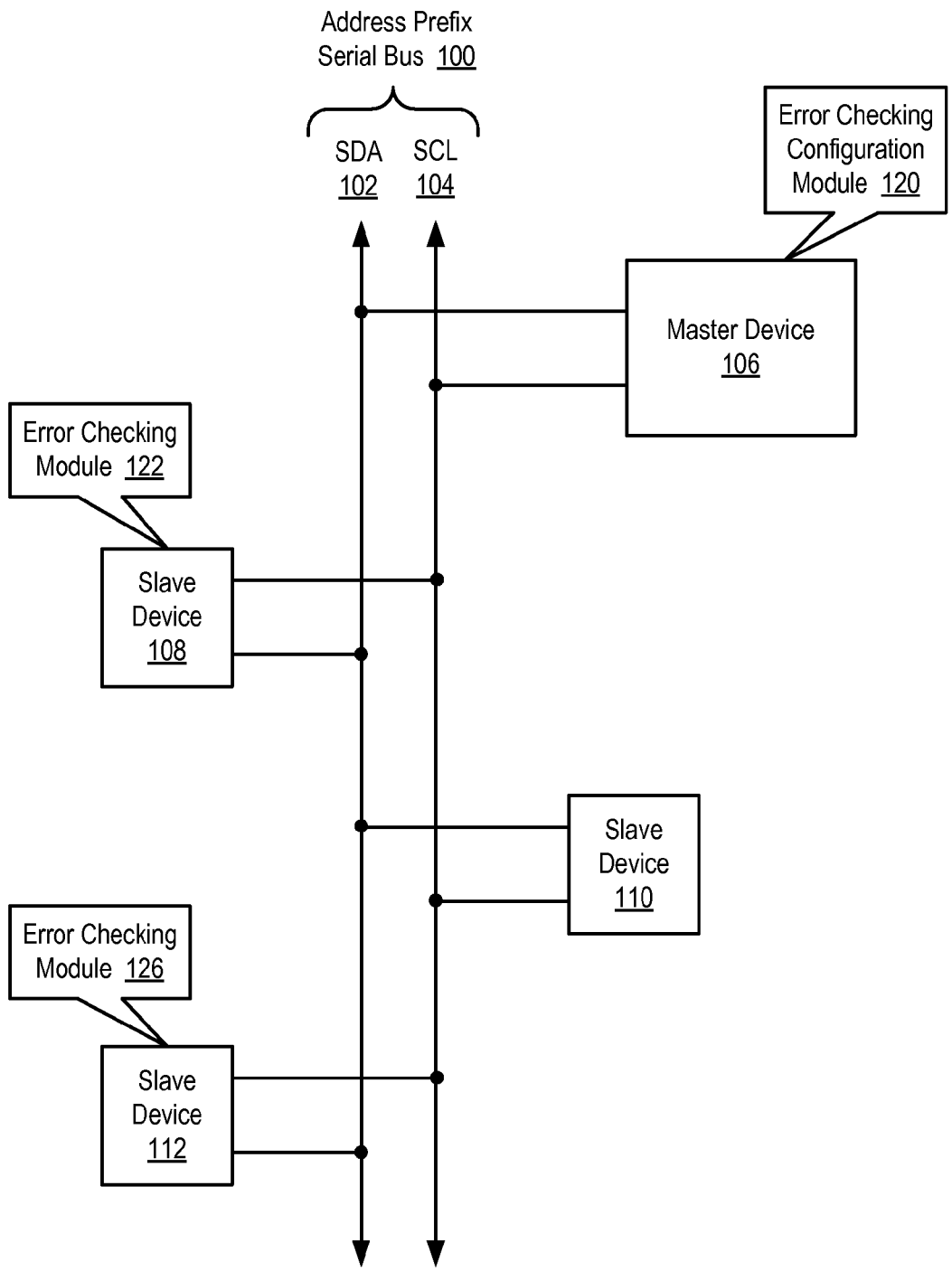
FIG. 1 sets forth a block diagram illustrating an exemplary system for communicating with error checking to a device capable of operating according to an address prefix serial bus protocol according to embodiments of the present invention.

Exemplary methods, apparatus, and products for communicating with error checking to a device capable of operating according to an address prefix serial bus protocol according to embodiments of the present invention are described with reference to the accompanying drawings, beginning with FIG. 1. FIG. 1 sets forth a block diagram illustrating an exemplary system for communicating with error checking to a device capable of operating according to an address prefix serial bus protocol according to embodiments of the present invention. The system of FIG. 1 operates generally to communicate with error checking to a device capable of operating according to an address prefix serial bus protocol according to embodiments of the present invention by identifying whether the device supports error checking, and if the device supports error checking: setting the device in an error checking mode, and sending a message with error checking data to the device.

An address prefix serial bus protocol is a protocol for serially transferring data along a computer bus for data communications between two devices, such as, for example, the Inter-Integrated Circuit ('I²C') Bus Protocol. When transferring data along a bus according to an address prefix serial bus protocol, one of the devices obtains control of the bus by initiating a session that lasts while the devices transfer messages containing data. A session is the period of time in which one device obtains control of an address prefix serial bus. The device initiating the session is referred to in this specification as a 'master device.' The device addressed by a master device is referred to in this specification as a 'slave device.' An address prefix serial bus protocol specifies that a master must transmit the address of a slave at the beginning of each session. The slave device addressed by the master device recognizes the slave device's own address at the beginning of the session and participates in the session accordingly. Other devices connected to the bus that were not addressed by the master device ignore the communications between the master device and the addressed slave device.

The exemplary system of FIG. 1 includes an address prefix serial bus (100). The address prefix serial bus (100) of FIG. 1 is an exemplary computer bus configured according to an address prefix serial bus protocol, such as, for example, the I²C bus protocol. The address prefix serial bus (100) of FIG. 1 includes a bi-directional serial data line ('SDA') (102) and a bi-directional serial clock line ('SCL') (104). The serial data line (102) is a transmission pathway that carries electrical signals that represent data between devices connected to the bus (100). The serial clock line (104) is a transmission pathway that carries electrical signals that represent clock signals used for timing operations between devices connected to the bus (100). Devices connected to the bus (100) utilize the clock signals transmitted along the serial clock line (104) to interpret the data transmitted along the serial data line (102).

The system of FIG. 1 also includes a master device (106) connected to the address prefix serial bus (100). The master device (106) is computer hardware capable of operating according to an address prefix serial bus protocol, such as, for example, the I²C bus protocol. The master device (106) may be implemented as a microcontroller, programmable logic device, a field programmable gate array, or any other computer hardware as will occur to those of skill in the art. The master device (106) initiates and terminates a session used for data communications between the master device (106) and other devices connected to the bus referred to as slave devices. During the session, the master device (106) is responsible for generating clock signals used to transmit and interpret the data transferred between the master device and the slave device.

The exemplary system of FIG. 1 also includes slave devices (108, 110, 112) connected to the address prefix serial bus (100). Each slave device (108, 110, 112) is computer hardware capable of operating according to an address prefix serial bus protocol, such as, for example, the I²C bus protocol. The slave devices may be implemented as a microcontroller, programmable logic device, a field programmable gate array, or any other computer hardware as will occur to those of skill in the art. Each slave device (108, 110, 112) has a unique address along the address prefix serial bus (100) that the master device (106) uses to initiate a session with a particular slave device.

In the example of FIG. 1, the master device (106) has installed upon it an error checking configuration module (120). The error checking configuration module (120) is a set of computer program instructions configured for communicating with error checking to a device capable of operating according to an address prefix serial bus protocol, such as, for example, the I²C bus protocol. The error checking configuration module (120) operates generally for communicating with error checking to a device capable of operating according to an address prefix serial bus protocol by identifying whether the device supports error checking, and if the device supports error checking: setting the device in an error checking mode, and sending a message with error checking data to the device.

Error checking is the process of detecting the errors in the data transferred among devices connected to the address prefix serial bus (100) that occur due to signal noise or other impairments present while transferring the data. In addition to detecting errors, error checking may also include the process of localizing the errors in the transferred data and correcting those errors. Error checking may, therefore, include error detection such as, for example, parity checking or may include error correction such as, for example, a cyclic redundancy check. A device capable of error checking is said to 'support' error checking. When a device performs error checking on transmitted or received data, the device is referred to in this specification as operating in an 'error checking mode.' In the example of FIG. 1, the slave devices (108, 112) support error checking, while the slave device (110) does not support error checking.

Parity checking is an error checking scheme that adds a parity bit to a message that indicates whether the number of '1' bits in the preceding data of the message was even or odd. The value of a parity bit computed over a message is generally referred to as the 'parity' of the message. The sender of a message computes the parity of the message being sent and stores the parity in the parity bit of the message. When the receiver receives the message, the receiver computes the parity of the message and compares the parity computed by the receiver with the parity computed by the sender that is stored in the message itself. Such a comparison by the receiver will indicate whether a single bit of the data was changed during transmission of the message. The most common convention, or parity scheme, is that a parity bit of '1' indicates that an odd number of ones exist in the data, and a parity bit of '0' indicates that an even number of ones exist in the data.

A cyclic redundancy check ('CRC') is an error checking scheme that uses a type of hash function to produce a checksum against the data of a message. The checksum is computed and added to the message by a sender and is typically contained in a small, fixed number of bits. After transmission of the message to a receiver, the receiver computes the checksum against the data of the message to determine whether any changes to the data occurred during transmission. Cyclic redundancy checks are often popular because CRCs are simple to implement in binary hardware, CRCs aid in detecting common errors caused by noise in transmission channels, and CRCs provide the ability to mathematically isolate and correct many such common errors.

Although the discussion above describes error checking to include parity checking and cyclic redundancy checks, such a description is for explanation, and not for limitation. Other examples of error checking useful in communicating with error checking to a device capable of operating according to an address prefix serial bus protocol according to embodiments of the present invention may include forward error correction, Hamming code, Reed-Muller code, erasure code, and any other error checking as will occur to those of skill in the art.

In the example of FIG. 1, the master device (106) communicates with the slave device (108, 112) using error checking. To communicate with the master device (106), each slave device (108, 112) has installed upon it an error checking module. The slave device (108) has installed upon it an error checking module (122). The slave device (112) has installed upon it an error checking module (126). Each error checking module (122, 126) is a set of computer program instructions for performing an error checking operation on the data transferred during a session with the master device (106).

Because each slave device (108, 112) may support a different method of error checking, each error checking module (122, 126) may perform a different error checking operation on the data transferred during a session with the master device (106). For example, the slave device (108) may implement error checking using parity checking and the slave device (112) may implement error checking using a cyclic redundancy check. In such an example, the master device (106) would implement parity checking when communicating with the slave device (108), and the master device (106) would implement cyclic redundancy checking when communicating with the slave device (112). To keep track of different implementations of error checking by the various slave devices connected to the address prefix serial bus (100), the master device (106) may maintain a table that associates a particular error checking implementation with a particular slave device. Because slave device (110) does not support error checking, slave device (110) does not have installed upon it an error checking module. The master device (106), therefore communicates with the slave device (110) in an normal mode of operation without error checking as specified in an address prefix serial bus protocol such as, for example, the I²C bus protocol.

Communicating with error checking to a device capable of operating according to an address prefix serial bus protocol in accordance with the present invention is generally implemented with computer hardware. In the system of FIG. 1, for example, the master device and the slave devices may be implemented using a microcontroller or a programmable logic device. For further explanation, therefore, FIG. 2 sets forth a block diagram of computer hardware comprising an exemplary microcontroller (152) useful in communicating with error checking to a device capable of operating according to an address prefix serial bus protocol according to embodiments of the present invention. The microcontroller (152) of FIG. 2 includes at least one computer processor (156) or 'CPU' as well as random access memory (168) ('RAM') which is connected through a system bus (160) to processor (156) and to other components of the microcontroller.

Stored in RAM (168) is an error checking configuration module (120). The error checking configuration module (120) is a set of computer program instructions configured for communicating with error checking to a device capable of operating according to an address prefix serial bus protocol, such as, for example, the I²C bus protocol. The error checking configuration module (120) operates generally for communicating with error checking to a device capable of operating according to an address prefix serial bus protocol by identifying whether the device supports error checking, and if the device supports error checking: setting the device in an error checking mode, and sending a message with error checking data to the device. Also stored in RAM (168) is an error checking module (122). The error checking module (122) is a set of computer program instructions for performing an error checking operation on the data transferred during a data communications session between two devices.

Figure 2:
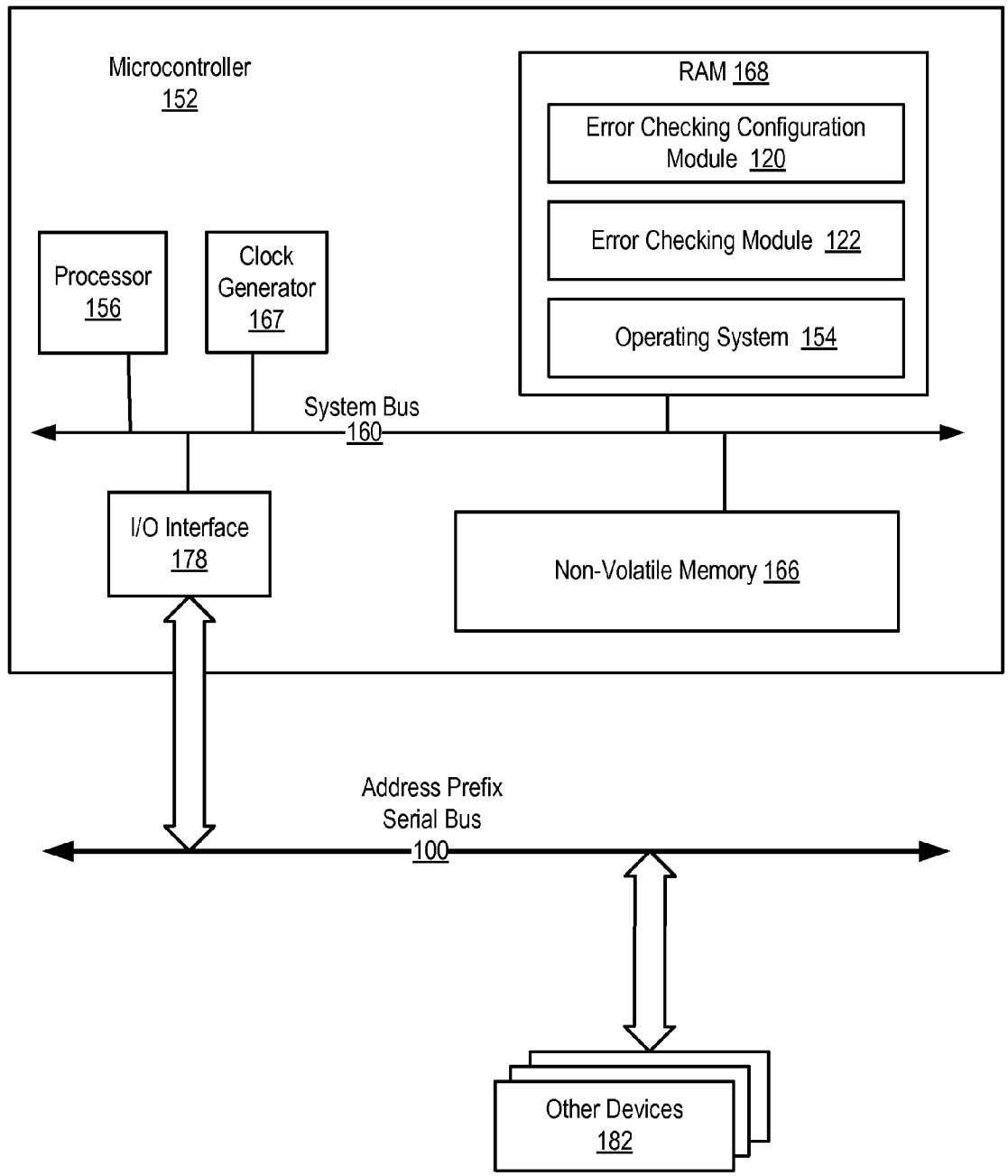
FIG. 2 sets forth a block diagram of computer hardware comprising an exemplary microcontroller useful in communicating with error checking to a device capable of operating according to an address prefix serial bus protocol according to embodiments of the present invention.

Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. Operating system (154), the error checking configuration module (120), and the error checking module (122) in the example of FIG. 2 are shown in RAM (168), but many components of such software typically are stored in non-volatile memory (166) also. Non-volatile computer memory (166) may be implemented using electrically erasable programmable read-only memory space (so-called 'EEPROM' or 'Flash' memory).

The exemplary microcontroller (152) also includes a clock generator (167). The clock generator (167) is computer hardware used to generate clock signals for use in timing operations of the microcontroller (152). To provide the clock signals, the clock generator (167) may include a crystal oscillator and a phase-locked-loop ('PLL') clock multiplier. The crystal oscillator is an electronic circuit that uses the mechanical resonance of a physical crystal of piezoelectric material along with an amplifier and a feedback loop to create an electrical signal with a very precise frequency. This precise frequency is used to provide a stable clock signal for the microcontroller (152). The PLL clock multiplier is an electronic circuit that maintains a generated clock signal in a fixed phase relationship to a reference signal provided by a crystal oscillator.

The example microcontroller of FIG. 2 also includes one or more input/output interface adapters (178). The input/output interface adapters (178) in microcontrollers implement data communications with other devices (182) connected to the address prefix serial bus (100). Such data communications may be carried out according to an address prefix serial bus protocol, such as, for example, the I²C bus protocol. An example of an input/output interface that may be useful in communicating with error checking to a device capable of operating according to an address prefix serial bus protocol may include an I²C interface.

Figure 3:
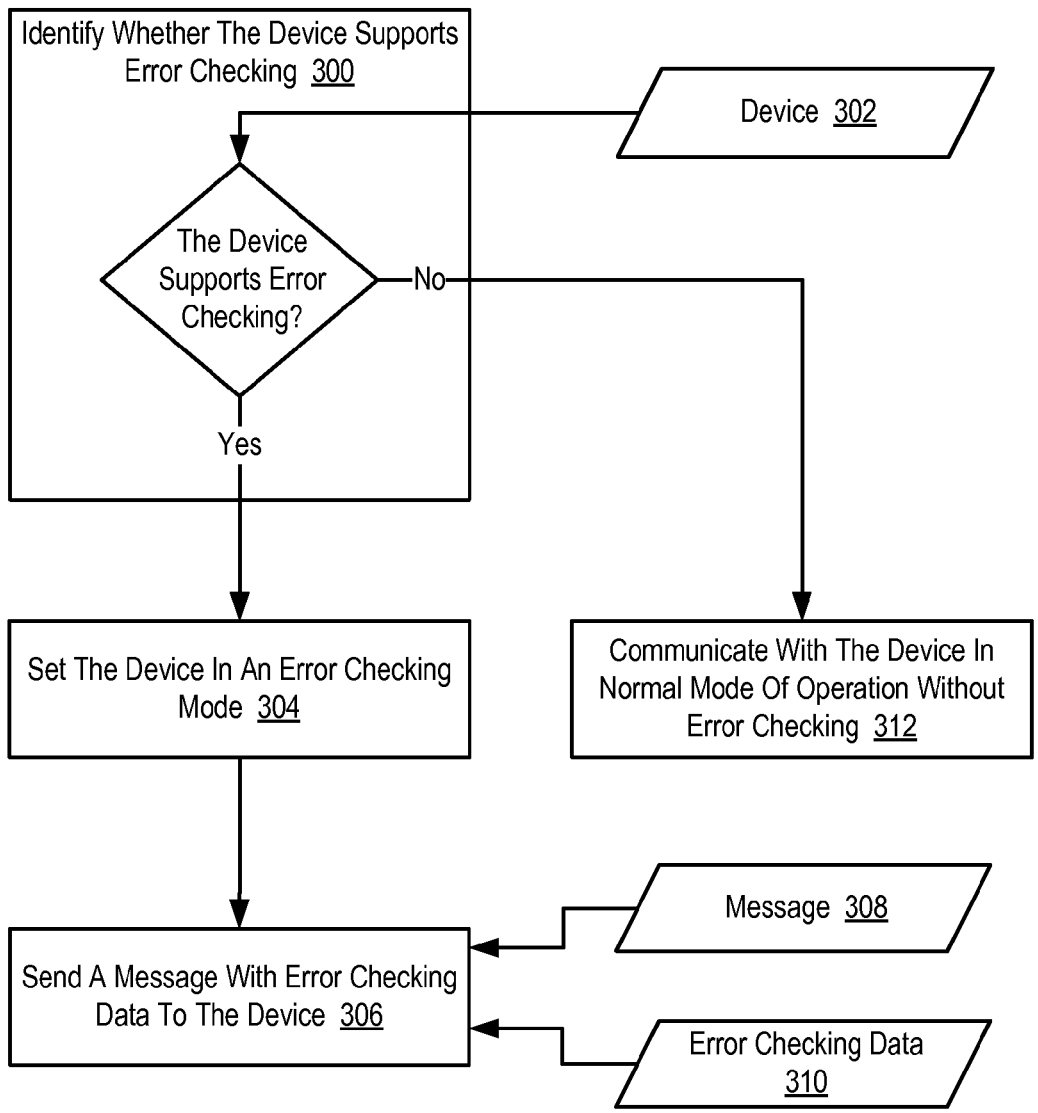
FIG. 3 sets forth a flow chart illustrating an exemplary method for communicating with error checking to a device capable of operating according to an address prefix serial bus protocol according to embodiments of the present invention.

For further explanation, FIG. 3 sets forth a flow chart illustrating an exemplary method for communicating with error checking to a device capable of operating according to an address prefix serial bus protocol according to embodiments of the present invention. The method of FIG. 3 includes identifying (300) whether the device (302) supports error checking. The device (302) represents a capable of operating according to an address prefix serial bus protocol. For example, the device (302) may represent a slave device operating according to the I²C bus protocol.

In the method of FIG. 3, identifying (300) whether the device (302) supports error checking may be carried out by polling the device (302) for error checking capability, storing the device's error checking capability in a device table, and retrieving the device's error checking capability from a device table as discussed below with reference to FIGS. 4 and 5. Identifying (300) whether the device (302) supports error checking using a device table advantageously allows for communicating with devices using disparate implementations of error checking.

The method of FIG. 3 also includes setting (304) the device (302) in an error checking mode if the device (302) supports error checking. Setting (304) the device (302) in an error checking mode if the device (302) supports error checking may be carried out by transferring data into an operating mode register of the device (302) to enable the error checking mode of operation. The operating mode register is a data register in the device for controlling the operating mode of the device (302). Transferring data into an operating mode register of the device (302) to enable the error checking mode of operation may be carried out according to an address prefix serial bus protocol. Consider, for example, an address prefix serial bus protocol such as the I²C bus protocol. Transferring data into an operating mode register of the device (302) to enable the error checking mode of operation may be carried out by transmitting the address of the device (302) along with a write control bit over an I²C bus, waiting for an acknowledgement from the device (302), transmitting to the device (302) the register number of the device's internal operating mode register, and transmitting data to the operating mode register of the device (302) to enable the error checking mode.

The register number of the operating mode register and the specific data transmitted to the operating mode register of the device to enable the error checking mode typically depends on the specific implementation of the device and the error checking modes supported. After setting (304) the device (302) in an error checking mode according to the method of FIG. 3, the device (302) begins operating in an error checking mode immediately and continues to operate in such a mode until the device is reset to a normal mode of operation using a operating mode register in the device (302) or the power to the device (302) is cycled.

The method of FIG. 3 also includes sending (306) a message (308) with error checking data (310) to the device (302) if the device (302) supports error checking. The message (308) represents an aggregation of data transferred to the device (302). The message (308) may include, for example, address data, control data, or device application data. Continuing with the example above in which an address prefix serial bus protocol is implemented as the I²C bus protocol, the message may be implemented as the 7-bit or 10-bit address of a device along with the read/write control bit, or implemented as a byte of data transferred to the device. The error checking data (310) of FIG. 3 represents data used for error checking such as, for example, the parity of a message or the checksum of a message. Sending (306) a message (308) with error checking data (310) to the device (302) if the device (302) supports error checking according to the method of FIG. 3 may be carried out by performing an error checking operation on the message (308) to obtain error checking data (310) as discussed below with reference to FIG. 6.

As explained above, not all the devices connected to an address prefix serial bus may have error checking capabilities. The method of FIG. 3, therefore, includes communicating (312) with the device (302) in a normal mode of operation without error checking if the device (302) does not support error checking. Communicating (312) with the device (302) in a normal mode of operation without error checking according to the method of FIG. 3 may be carried out according to an address prefix serial bus protocol such as, for example, the I²C bus protocol.

As mentioned above, identifying whether the device supports error checking may be carried out by retrieving the device's error checking capability from a device table. For further explanation, therefore, FIG. 4 sets forth a flow chart illustrating a further exemplary method for communicating with error checking to a device capable of operating according to an address prefix serial bus protocol according to embodiments of the present invention that includes retrieving (400) the device's error checking capability from a device table (402).

Figure 4:
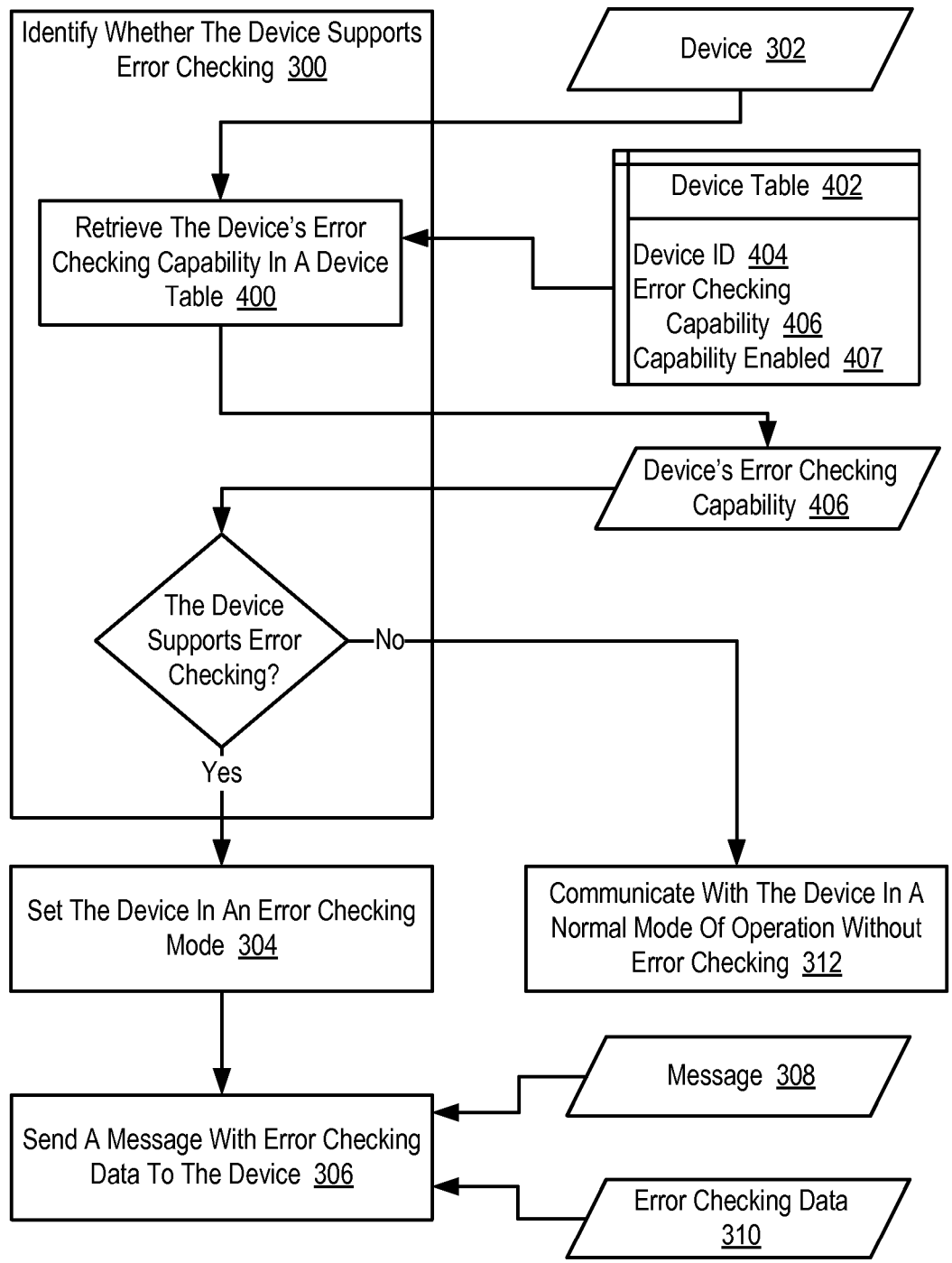
FIG. 4 sets forth a flow chart illustrating a further exemplary method for communicating with error checking to a device capable of operating according to an address prefix serial bus protocol according to embodiments of the present invention.

The method of FIG. 4 is similar to the method of FIG. 3. That is, method of FIG. 4 is similar to the method of FIG. 3 in that the method of FIG. 4 includes identifying (300) whether the device (302) supports error checking, setting (304) the device (302) in an error checking mode if the device (302) supports error checking, sending (306) a message (308) with error checking data (310) to the device (302) if the device (302) supports error checking, and communicating (312) with the device (302) in a normal mode of operation without error checking if the device (302) does not support error checking. The example of FIG. 4 is also similar to the example of FIG. 3 in that the example of FIG. 4 includes a device (302), message (308), and error checking data (310).

The example of FIG. 4 includes a device table (402) that associates a device identifier (404) with an error checking capability (406) field and a capability enabled (407) field. The device identifier (404) represents a particular device connected to an address prefix serial bus and capable of operating according to an address prefix serial bus protocol, such as, for example, the I²C bus protocol. The values stored in the device identifier (404) of each record of the device table (402) are typically the addresses of the devices connected to an address prefix serial bus. The error checking capability (406) represents an error checking mode supported by a device. The error checking capability (406) indicates whether a device supports error detection such as, for example, parity checking or supports error correction such as, for example, a cyclic redundancy check. The device table (402) may associate a device with zero, one, or more error checking capabilities. The capability enabled (407) field represents whether a device having one or more error checking capabilities is currently operating in a particular error checking mode. When a device is set in a particular error checking mode, the appropriate capability enabled (407) field may be flagged for the device.

In the method of FIG. 4, identifying (300) whether the device (302) supports error checking includes retrieving (400) the device's error checking capability (406) from a device table (402). In the example of FIG. 4, retrieving (400) the device's error checking capability (406) from a device table (402) may be carried out by looking up the address of the device by the device identifier (404) and reading the value of the associated error checking capability (406). The method of FIG. 4 may then continue as described above with reference to FIG. 3.

As mentioned above, identifying whether the device supports error checking may be carried out by polling the device for error checking capability and storing the device's error checking capability in a device table. For further explanation, therefore, FIG. 5 sets forth a flow chart illustrating a further exemplary method for communicating with error checking to a device capable of operating according to an address prefix serial bus protocol according to embodiments of the present invention that includes polling (500) the device (302) for error checking capability, and storing (502) the device's error checking capability in a device table (402).

Figure 5:
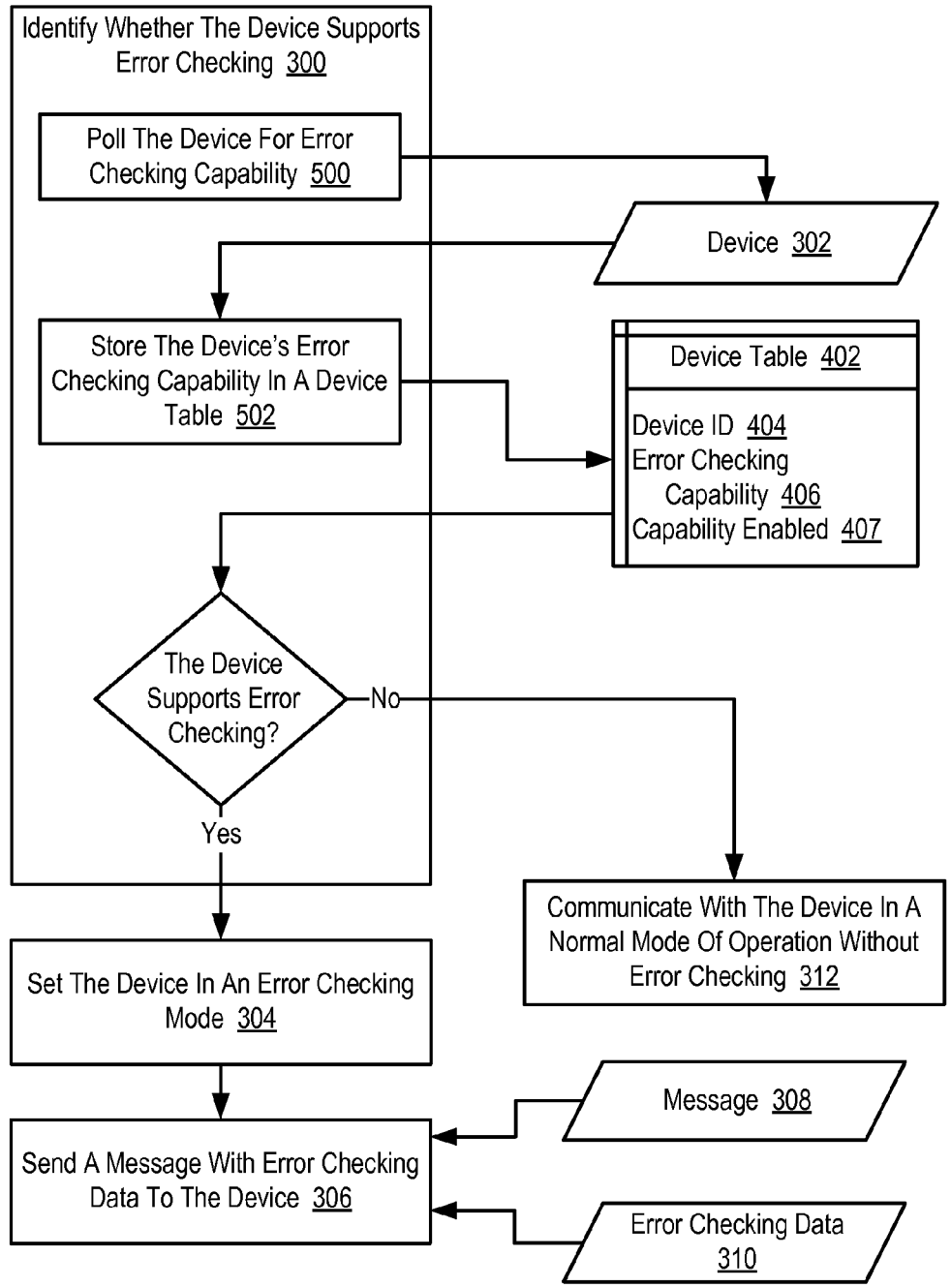
FIG. 5 sets forth a flow chart illustrating a further exemplary method for communicating with error checking to a device capable of operating according to an address prefix serial bus protocol according to embodiments of the present invention.

The method of FIG. 5 is similar to the methods of FIGS. 3 and 4. That is, method of FIG. 5 is similar to the method of FIG. 3 in that the method of FIG. 5 includes identifying (300) whether the device (302) supports error checking, setting (304) the device (302) in an error checking mode if the device (302) supports error checking, sending (306) a message (308) with error checking data (310) to the device (302) if the device (302) supports error checking, and communicating (312) with the device (302) in a normal mode of operation without error checking if the device (302) does not support error checking. The example of FIG. 5 is also similar to the example of FIG. 3 in that the example of FIG. 5 includes a device (302), message (308), and error checking data (310). The example of FIG. 5 is also similar to the example of FIG. 4 in that the example of FIG. 5 includes a device table (402) that associates a device identifier (404) with an error checking capability (406) field and a capability enabled (407) field.

In the method of FIG. 5, identifying (300) whether the device (302) supports error checking includes polling (500) the device (302) for error checking capability. Polling (500) the device (302) for error checking capability may be carried out by reading the capabilities register of a device (302) to obtain the device's capabilities according to an address prefix serial bus protocol. The capabilities register is a data register that stores data specifying the capabilities of the device such as, for example, whether the device supports error checking, high-speed communications, particular address schemes, and so on. Consider, for example, an address prefix serial bus protocol such as the I²C bus protocol. Reading the capabilities register of a device (302) to obtain the device's capabilities may be carried out by transmitting the address of the device (302) along with a read control bit over an I²C bus, waiting for an acknowledgement from the device (302), transmitting to the device (302) the register number of the device's internal capabilities register, and receiving data from the capabilities register of the device (302) to obtain the device's error checking capabilities. The register number of the capabilities register and the data received from the capabilities register that specifies the device's error checking capabilities typically depends on the specific implementation of the device and the error checking modes supported.

In the method of FIG. 5, identifying (300) whether the device (302) supports error checking also includes storing (502) the device's error checking capability in a device table (402). Storing (502) the device's error checking capability in a device table (402) may be carried out by associating in the device table (402) the device's error checking capability (406) with the device identifier (404) having a value of the device's address on an address prefix serial bus. The method of FIG. 5 may then continue as described above with reference to FIG. 3.

As mentioned above, sending a message with error checking data to the device may be carried out by performing an error checking operation on the message to obtain error checking data. For further explanation, therefore, FIG. 6 sets forth a flow chart illustrating a further exemplary method for communicating with error checking to a device capable of operating according to an address prefix serial bus protocol according to embodiments of the present invention that includes performing (600) an error checking operation on the message (308) to obtain error checking data (310).

Figure 6:
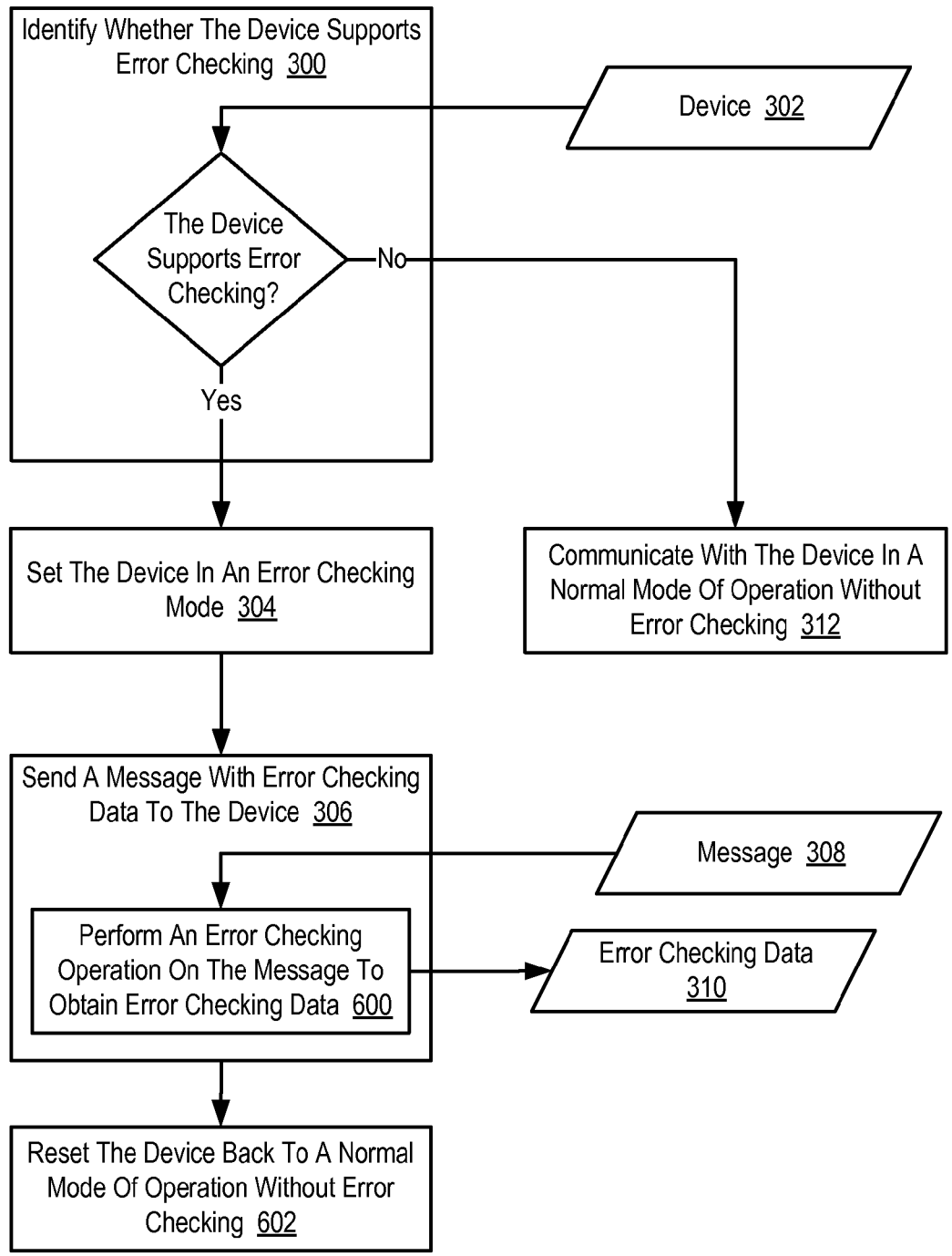
FIG. 6 sets forth a flow chart illustrating a further exemplary method for communicating with error checking to a device capable of operating according to an address prefix serial bus protocol according to embodiments of the present invention.

The method of FIG. 6 is similar to the method of FIG. 3. That is, method of FIG. 6 is similar to the method of FIG. 3 in that the method of FIG. 6 includes identifying (300) whether the device (302) supports error checking, setting (304) the device (302) in an error checking mode if the device (302) supports error checking, sending (306) a message (308) with error checking data (310) to the device (302) if the device (302) supports error checking, and communicating (312) with the device (302) in a normal mode of operation without error checking if the device (302) does not support error checking. The example of FIG. 6 is also similar to the example of FIG. 3 in that the example of FIG. 6 includes a device (302), message (308), and error checking data (310).

In the method of FIG. 6, sending (306) a message (308) with error checking data (310) to the device (302) if the device (302) supports error checking includes performing (600) an error checking operation on the message (308) to obtain error checking data (310). Readers will recall from above that an error checking operation may include an error detection scheme such as, for example, parity checking, and that error checking data may, for example, be the parity of a message. Performing (600) an error checking operation on the message (308) to obtain error checking data (310) may, therefore, be carried out by performing a parity checking operation on the message (308) to obtain the parity of the message (308), appending the parity of the message to the end of the message (308), and transmitting both the message (308) and the appended parity to the device (302). Although performing (600) an error checking operation on the message (308) to obtain error checking data (310) is described above with reference to performing parity checking, such a description is for explanation and not for limitation. In fact, performing (600) an error checking operation on the message to obtain error checking data may be carried out by performing a cyclic redundancy check to obtain a checksum, performing a forward error correction, or performing any other error checking as will occur to those of skill in the art to obtain error the checking data.

The method of FIG. 6 also includes resetting (602) the device (302) back to a normal mode of operation without error checking. Resetting (602) the device (302) back to a normal mode of operation without error checking may be carried out by transferring data into an operating mode register of the device (302) to enable the normal mode of operation. Transferring data into an operating mode register of the device (302) to enable the normal mode of operation may be carried out according to an address prefix serial bus protocol improved to support error checking. Consider, for example, an address prefix serial bus protocol improved to support error checking such as the I²C bus protocol. Transferring data into an operating mode register of the device (302) to enable the normal mode of operation may be carried out by transmitting the address of the device (302) along with a write control bit and error checking data (310) over an I²C bus, waiting for an acknowledgement from the device (302), transmitting the register number of the device's internal operating mode register along with error checking data (310), and transmitting data to the operating mode register of the device (302) to enable the error checking mode along with error checking data. The register number of the operating mode register and the data transmitted to the operating mode register of the device typically depends on the specific implementation of the device and the error checking modes supported. After resetting (602) the device (302) back to a normal mode of operation without error checking according to the method of FIG. 6, the device (302) resumes operating in a normal mode immediately.

Readers will recall that the methods of FIGS. 3, 4, 5, and 6, include sending a message with error checking data to the device. For further explanation, therefore, FIG. 7 sets forth a line drawing that illustrates exemplary messages (716, 718, 720) with error checking (706) useful for communicating with error checking to a device capable of operating according to an address prefix serial bus protocol according to embodiments of the present invention. The example of FIG. 7 includes a serial data line ('SDA') (102) and a serial clock line ('SCL') (104) for transmitting the exemplary messages (716, 718, 720) of FIG. 7 along a bus configured according to an address prefix serial bus protocol. Master devices connected to an address prefix serial bus are typically responsible for generating their own clock signals on the serial clock line (104) when initiating transfers on the address prefix serial bus. Data transmitted on the serial data line (102) is typically only valid during the HIGH logic level of the clock signal on the serial clock line (104).

Figure 7:
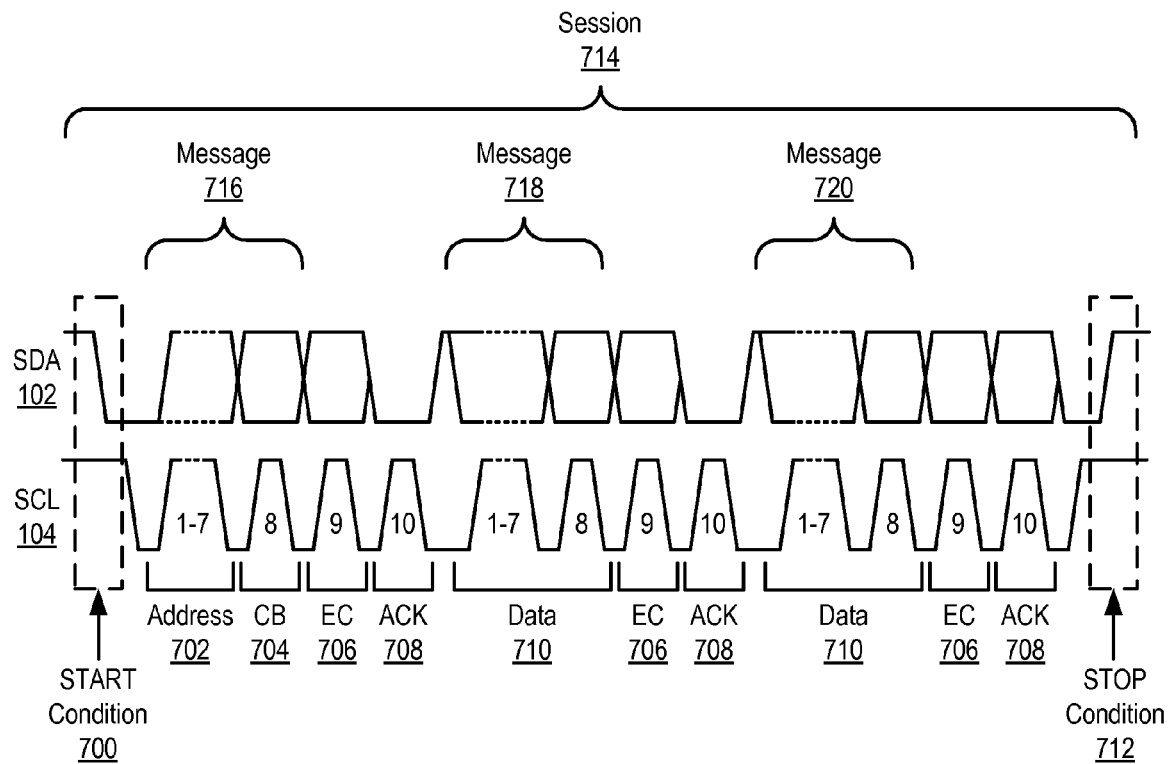
FIG. 7 sets forth a line drawing that illustrates exemplary messages with error checking useful for communicating with error checking to a device capable of operating according to an address prefix serial bus protocol according to embodiments of the present invention.

The exemplary messages (716, 718, 720) of FIG. 7 are transferred between two devices, a master device and a slave device, during a session (714). The beginning of the session (714) of FIG. 7 occurs when a master device initiates the session (714) by signaling a start condition (700). The start condition (700) occurs when the signal on the SDA (102) transitions from a HIGH logic level to a LOW logic level while the clock signal on the SCL (104) remains at a HIGH logic level. A start condition (700) notifies all the devices on the address prefix serial bus that a device address (702) immediately follows. The devices on the address prefix serial bus compare the address (702) transmitted along the bus with the device's own address. If the address (702) on the bus is the same as the device's own address, the device participates in the data communications during the session (714). Except for the master device initiating the session and the addressed slave device, the other devices do not communicate on the bus until the session (714) ends. The end of the session (714) of FIG. 7 occurs when a master device signals a stop condition (712). The stop condition (712) occurs when the signal on the SDA (102) transitions from a LOW logic level to a HIGH logic level while the clock signal on the SCL (104) remains at a HIGH logic level.

In the example of FIG. 7, the message (716) is the first message of the session (714) transmitted by the master on the address prefix serial bus. The message (716) of FIG. 7 is structured to include seven address bits (702) and one control bit ('CB') (704). The address bits (702) are used to transmit the address of a device on the address prefix serial bus with which the master device is communicating. The control bit (704) indicates whether the subsequent messages of the session (714) are writing data to the device or reading data from the device. Messages (718, 720) of FIG. 7 are structured to include eight data bits (710). The data bits (710) are used to transmit the data to or from the device whose address on the bus is indicated by the address bits (702) of the message (716).

In the example of FIG. 7, an error checking ('EC') bit (706) immediately follows each message (716, 718, 720). The error checking bits (706) transmit the error checking data used to detect or correct errors in the messages (716, 718, 720) transmitted. The error checking bits (706) may, for example, be used by a master device to transmit the parity of each message (716, 718, 720). Although FIG. 7 depicts only one error checking bit (706) following each message (716, 718, 720), such a depiction is for explanation and not for limitation. Any number of error checking bits may follow each message (716, 718, 720) depending on the error checking operation performed for the addressed device.

In the example of FIG. 7, an acknowledgement ('ACK') bit (708) follows each error checking bit (706). After receiving each message, the device performs an error checking operation on the message. If the error checking operation reveals that the message contains no data errors, the device receiving the message acknowledges that data was accurately received by transmitting an acknowledgement signal using the acknowledgement bit (708). If the error checking operation reveals that the message contains data errors, the device receiving the message does not transmit an acknowledgement signal in the acknowledgement bit (708).

Exemplary embodiments of the present invention are described largely in the context of a fully functional computer system for communicating with error checking to a device capable of operating according to an address prefix serial bus protocol, such as, for example, the I²C bus protocol. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for communicating with error checking to a device capable of operating according to an address prefix serial bus protocol, the method comprising:
identifying whether the device supports error checking; and
if the device supports error checking:
setting the device in an error checking mode, and
sending a message with error checking data to the device.

2. The method of claim 1 wherein the address prefix serial bus protocol is the Inter-Integrated Circuit ('I2C') Bus protocol.

3. The method of claim 1 wherein sending a message with error checking data to the device further comprises performing an error checking operation on the message to obtain error checking data.

4. The method of claim 1 wherein identifying whether the device supports error checking further comprises retrieving the device's error checking capability from a device table.

5. The method of claim 1 wherein identifying whether the device supports error checking further comprises:
polling the device for error checking capability; and
storing the device's error checking capability in a device table.

6. The method of claim 1 further comprising resetting the device back to a normal mode of operation without error checking.

7. The method of claim 1 wherein error checking further comprises error correction.

8. The method of claim 1 wherein error checking further comprises error detection.

9. An apparatus for communicating with error checking to a device capable of operating according to an address prefix serial bus protocol, the apparatus comprising a computer processor, a computer memory operatively coupled to the computer processor, the computer memory having disposed within it computer program instructions capable of:
identifying whether the device supports error checking; and
if the device supports error checking:
setting the device in an error checking mode, and
sending a message with error checking data to the device.

10. The apparatus of claim 9 wherein the address prefix serial bus protocol is the Inter-Integrated Circuit ('I2C') Bus protocol.

11. The apparatus of claim 9 wherein sending a message with error checking data to the device further comprises performing an error checking operation on the message to obtain error checking data.

12. The apparatus of claim 9 wherein identifying whether the device supports error checking further comprises retrieving the device's error checking capability from a device table.

13. The apparatus of claim 9 wherein identifying whether the device supports error checking further comprises:
polling the device for error checking capability; and storing the device's error checking capability in a device table.

14. A computer program product for communicating with error checking to a device capable of operating according to an address prefix serial bus protocol, the computer program product disposed upon a computer readable recordable medium, the computer program product comprising computer program instructions capable of:

identifying whether the device supports error checking; and if the device supports error checking:

setting the device in an error checking mode, and sending a message with error checking data to the device.

15. The computer program product of claim 14 wherein the address prefix serial bus protocol is the Inter-Integrated Circuit ('I2C') Bus protocol.

16. The computer program product of claim 14 wherein sending a message with error checking data to the device further comprises performing an error checking operation on the message to obtain error checking data.

17. The computer program product of claim 14 wherein identifying whether the device supports error checking further comprises retrieving the device's error checking capability from a device table.

18. The computer program product of claim 14 wherein identifying whether the device supports error checking further comprises:

polling the device for error checking capability; and storing the device's error checking capability in a device table.

* * * * *